US012453940B2

(12) United States Patent
Ohdou et al.

(10) Patent No.: US 12,453,940 B2
(45) Date of Patent: Oct. 28, 2025

(54) AIR CONDITIONING ROTATING BODY AND AIR TREATMENT DEVICE

(71) Applicant: DAIKIN INDUSTRIES, LTD., Osaka (JP)

(72) Inventors: Tsunahiro Ohdou, Osaka (JP); Takashi Takahashi, Osaka (JP); Eisaku Okubo, Osaka (JP); Hidekazu Tanaka, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 395 days.

(21) Appl. No.: 18/103,920

(22) Filed: Jan. 31, 2023

(65) Prior Publication Data
US 2023/0173429 A1    Jun. 8, 2023

Related U.S. Application Data

(63) Continuation of application No. PCT/JP2021/018563, filed on May 17, 2021.

(30) Foreign Application Priority Data

Aug. 7, 2020   (JP) .................................. 2020-134347

(51) Int. Cl.
*B01D 53/02*   (2006.01)
*B01D 53/06*   (2006.01)
(Continued)

(52) U.S. Cl.
CPC ........... *B01D 53/06* (2013.01); *B01D 53/261* (2013.01); *F24F 3/1423* (2013.01); *F24F 3/16* (2013.01);
(Continued)

(58) Field of Classification Search
CPC ...... B01D 2253/108; B01D 2253/3425; B01D 2257/80; B01D 2259/4009;
(Continued)

(56) References Cited

U.S. PATENT DOCUMENTS 4,875,520 A    10/1989 Steele et al.
4,924,934 A  *  5/1990 Steele .................... F24F 3/1423
                                                                  165/8
(Continued)

FOREIGN PATENT DOCUMENTS

CN    202083055 U    12/2011
JP    2004-321964 A    11/2004
(Continued)

OTHER PUBLICATIONS

International Search Report of corresponding PCT Application No. PCT/JP2021/018563 dated Jul. 20, 2021.
(Continued)

*Primary Examiner* — Christopher P Jones
(74) *Attorney, Agent, or Firm* — GLOBAL IP COUNSELORS, LLP

(57) ABSTRACT

An air conditioning rotating body including a rotor having a cylindrical shape. The rotor is housed in a casing so as to be freely rotatable. The casing includes a seal member. The air conditioning rotating body treats air passing through the rotor in an axial direction. The seal member extends in a radial direction of the rotor and separates air passages. An end face of the rotor in the axial direction is provided with at least one spoke in contact with the seal member. A contact point of the seal member with the spoke is configured to move in the radial direction as the rotor rotates.

20 Claims, 9 Drawing Sheets

(51) Int. Cl.
   *B01D 53/26*   (2006.01)
   *F24F 3/14*    (2006.01)
   *F24F 3/16*    (2021.01)
(52) U.S. Cl.
   CPC .... *B01D 2253/108* (2013.01); *B01D 2257/80* (2013.01); *B01D 2259/4009* (2013.01)
(58) Field of Classification Search
   CPC ............ B01D 2259/4508; B01D 53/06; B01D 53/261; F24F 2203/1004; F24F 2203/1012; F24F 2203/1096; F24F 3/1423; F24F 3/16
   See application file for complete search history.

(56) References Cited

U.S. PATENT DOCUMENTS

| | | | | |
|---|---|---|---|---|
| 5,595,238 | A * | 1/1997 | Mark | B01D 53/06 165/8 |
| 5,878,590 | A * | 3/1999 | Kadle | F24F 3/1423 62/271 |
| 6,684,649 | B1 * | 2/2004 | Thompson | F24F 3/1423 62/93 |
| 2003/0056884 | A1 * | 3/2003 | Belding | F24F 3/1423 156/205 |
| 2004/0231179 | A1 | 11/2004 | Kodama et al. | |
| 2005/0172805 | A1 * | 8/2005 | Motono | B01D 53/261 96/125 |
| 2005/0246918 | A1 * | 11/2005 | Tanahashi | B01D 53/06 34/80 |
| 2008/0127820 | A1 | 6/2008 | Park et al. | |
| 2011/0132191 | A1 * | 6/2011 | Fredenhagen | B01D 53/06 95/41 |
| 2016/0370022 | A1 | 12/2016 | Jang et al. | |
| 2017/0165602 | A1 * | 6/2017 | Postage | B65D 81/26 |
| 2017/0282120 | A1 | 10/2017 | Uramoto et al. | |
| 2023/0167906 | A1 * | 6/2023 | Ohdou | F16J 15/4476 277/418 |

FOREIGN PATENT DOCUMENTS

| | | |
|---|---|---|
| JP | 3755708 B2 | 1/2006 |
| JP | 2008-128633 A | 6/2008 |
| JP | 2016-73920 A | 5/2016 |

OTHER PUBLICATIONS

International Preliminary Report of corresponding PCT Application No. PCT/JP2021/018563 dated Feb. 16, 2023.
European Search Report of corresponding EP Application No. 21 85 3887.4 dated Oct. 18, 2023.

* cited by examiner

AIR CONDITIONING ROTATING BODY AND AIR TREATMENT DEVICE

CROSS-REFERENCE TO RELATED APPLICATIONS

This is a continuation of International Application No. PCT/JP2021/018563 filed on May 17, 2021, which claims priority to Japanese Patent Application No. 2020-134347, filed on Aug. 7, 2020. The entire disclosures of these applications are incorporated by reference herein.

BACKGROUND

Technical Field

The present disclosure relates to an air conditioning rotating body and an air treatment device.

Background Art

There is an air treatment device in which a rotor made of a material with excellent heat storage properties, such as aluminum and stainless steel, is rotated about a shaft, with a portion of the rotor placed in an exhaust passage and the other portion of the rotor placed in an air supply passage. Such an air treatment device is used as a heat exchanger configured to exchange heat between exhaust air and supply air.

There is also an air treatment device in which a rotor having a honeycomb structure on which an adsorbent, such as zeolite and porous silica, is supported is rotated about a shaft, and which is configured such that treated air passes through a portion of the rotor and regenerated air passes through the other portion of the rotor. Such an air treatment device is used for humidity control, deodorization, and other purposes.

An air treatment device using a rotor which serves as an air conditioning rotating body is configured such that the rotor is housed in a casing so as to be freely rotatable, and that seal members are provided along the diameter and outer circumference of the rotor to define an air passage. Patent Document 1 discloses having spokes on both end surface portions of a case housing a rotor (honeycomb body), with ventilation holes between the spokes, and making seal members have a width greater than a width of the ventilation holes. In the configuration of the Japanese Patent No. 3755708, the seal members and both of the end surface portions of the case are in contact with each other, preventing the honeycomb body from making direct contact with the seal member. Wear of the honeycomb body can thus be avoided.

SUMMARY

A first aspect of the present disclosure is directed to an air conditioning rotating body including a rotor having a cylindrical shape. The rotor is configured to be housed in a casing so as to be freely rotatable. The casing includes a seal member. The air conditioning rotating body is configured to treat air passing through the rotor in an axial direction. The seal member extends in a radial direction of the rotor and separating air passages. An end face of the rotor in the axial direction being is provided with at least one spoke in contact with the seal member. A contact point of the seal member with the spoke is configured to move in the radial direction as the rotor rotates.

DETAILED DESCRIPTION OF EMBODIMENT(S)

Embodiment

An embodiment of the present disclosure will be described in detail below with reference to the drawings. The present disclosure is not limited to the embodiment shown below, and various changes can be made within the scope without departing from the technical concept of the present disclosure. Since each of the drawings is intended to illustrate the disclosure conceptually, dimensions, ratios, or numbers may be exaggerated or simplified as necessary for ease of understanding.

Configuration of Air Treatment Device

Figure 1:
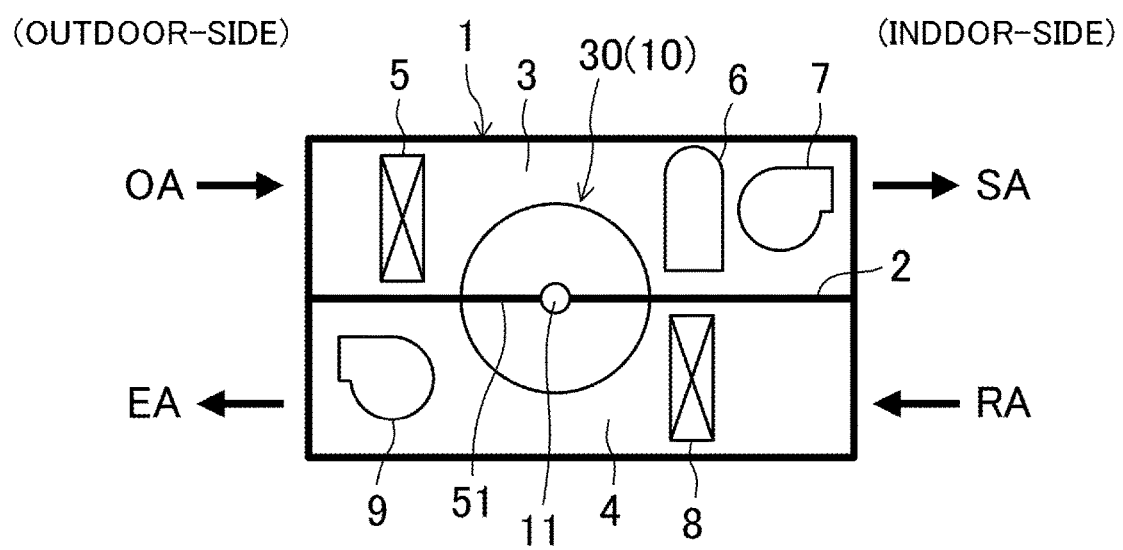
FIG. 1 is a schematic view illustrating a general configuration of an air treatment device according to an embodiment.

An air treatment device (1) of this embodiment is configured as a dehumidifying/humidifying device, for example. As illustrated in FIG. 1, the interior of the air treatment device (1) includes air passages (3) and (4) that are separated by a division wall (2). In the air treatment device (1), outdoor air (OA) taken from an outdoor space is supplied to an indoor space as supply air (SA) via the air passage (3), and return air (RA) taken from the indoor space is discharged to the outdoor space as exhaust air (EA) via the air passage (4).

An air conditioning rotating body (30) of this embodiment has a cylindrical rotor (10) made of a honeycomb-shaped adsorption element on which zeolite, for example, or another substance is supported, and a shaft (11) inserted in the center of the rotor (10). The shaft (11) is arranged on the boundary between the air passages (3) and (4). In other words, the air conditioning rotating body (30) is arranged over both of the air passages (3) and (4). The air passages (3) and (4) are each configured so that air flows in opposite directions and passes through the rotor (10) in its axial direction. Seal members (51), which separate the air passages (3) and (4) from each other, are slidably in contact with both axial end faces of the air conditioning rotating body (30).

In the air passage (3), a heat exchanger (5) is arranged upstream (outdoor-side) of the air conditioning rotating body (30), and a compressor (6) and a fan (7) are sequentially arranged downstream (indoor-side) of the air conditioning rotating body (30). In the air passage (4), a heat exchanger (8) is arranged upstream (indoor-side) of the air conditioning rotating body (30), and a fan (9) is arranged downstream (outdoor-side) of the air conditioning rotating body (30).

In a dehumidifying operation of the air treatment device (1), the rotor (10) is rotated to allow an adsorbent of the rotor (10) to adsorb water vapor from the air passing through the air passage (3), thereby generating dehumidified air. On the other hand, the adsorbent is regenerated by desorbing the water vapor from the adsorbent of the rotor (10) by air that is heated to a predetermined temperature and passes through the air passage (4). In this case, the heat exchanger (5) in the air passage (3) serves as an evaporator, and the heat exchanger (8) in the air passage (4) serves as a condenser.

In a humidifying operation of the air treatment device (1), the rotor (10) is rotated to allow the adsorbent of the rotor (10) to adsorb water vapor from the air passing through the air passage (4). On the other hand, humidified air is generated, and the adsorbent is regenerated, by desorbing the water vapor from the adsorbent of the rotor (10) by air that is heated to a predetermined temperature and passes through the air passage (3). In this case, the heat exchanger (5) in the air passage (3) serves as a condenser, and the heat exchanger (8) in the air passage (4) serves as an evaporator.

Configuration of Air Conditioning Rotating Body

Figure 2:
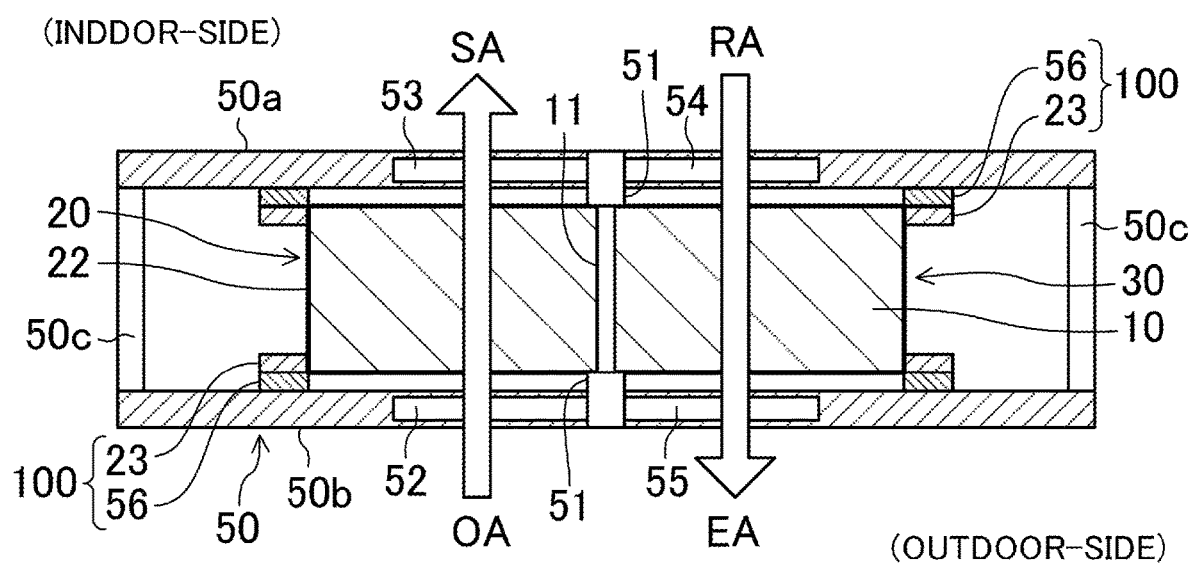
FIG. 2 is a schematic view illustrating a cross-sectional configuration of an air conditioning rotating body according to the embodiment.

In the air treatment device (1), the air conditioning rotating body (30) is housed in a casing (50) so as to be freely rotatable as illustrated in FIG. 2. The air conditioning rotating body (30) includes a protective case (20) that protects the rotor (10). The protective case (20) includes a side plate (22) that covers the side surface on the outer circumference of the rotor (10). The protective case (20) rotates about the shaft (11) together with the rotor (10).

The casing (50) includes a substantially square-shaped upper plate (50a) and lower plate (50b), which face each other in the axial direction of the rotor (10) with the air conditioning rotating body (30) interposed therebetween, and supports (50c) that connect the upper plate (50a) and the lower plate (50b) at the respective four corners. The upper plate (50a) has an exhaust port (53) connected to the downstream side of the air passage (3) and an intake port (54) connected to the upstream side of the air passage (4). The lower plate (50b) has an intake port (52) connected to the upstream side of the air passage (3) and an exhaust port (55) connected to the downstream side of the air passage (4). The intake ports (52) and (54) and the exhaust ports (53) and (55) each have a substantially semicircular shape when viewed from the axial direction of the rotor (10). The intake port (52) of the lower plate (50b) and the exhaust port (53) of the upper plate (50a) overlap each other when viewed from the axial direction of the rotor (10). The intake port (54) of the upper plate (50a) and the exhaust port (55) of the lower plate (50b) overlap each other when viewed from the axial direction of the rotor (10).

The seal members (51) are arranged at the boundary between the exhaust port (53) and the intake port (54) in the upper plate (50a) and at the boundary between the intake port (52) and the exhaust port (55) in the lower plate (50b). The seal members (51) are slidably in contact with respective axial end faces of the air conditioning rotating body (30). This configuration can reduce leakage of air, which is sucked from the intake port (52) of the lower plate (50b), leaking to the exhaust port (55) of the lower plate (50b) through the space between the rotor (10) and the lower plate (50b) without passing through the rotor (10). This configuration can also reduce leakage of air, which is sucked from the intake port (54) of the upper plate (50a), leaking to the exhaust port (53) of the upper plate (50a) through the space between the rotor (10) and the upper plate (50a) without passing through the rotor (10).

A rotor-side seal (23) is provided on each of upper and lower portions of the side surface on the outer circumference of the rotor (10), that is, the side plate (22) covering the outer circumferential portion of the rotor (10). A casing-side seal (56) is provided at a portion opposite to the rotor-side seal (23) on each of the upper plate (50a) and the lower plate (50b). The rotor-side seal (23) and the casing-side seal (56) engage with each other to constitute a labyrinth seal structure (100). In other words, the labyrinth seal structure (100) is provided between the outer circumferential portion of the rotor (10) and the casing (50). This configuration can reduce leakage of air, which is sucked from the intake port (52) of the lower plate (50b), leaking to the exhaust port (53) of the upper plate (50a) while bypassing the rotor (10). This configuration can also reduce leakage of air, which is sucked from the intake port (54) of the upper plate (50a), leaking to the exhaust port (55) of the lower plate (50b) while bypassing the rotor (10). Thus, the labyrinth seal structure (100) can reduce both of the air leakage from the center toward the outer circumference of the rotor and the air leakage from the outer circumference toward the center of the rotor. The labyrinth seal structure (100) may include a first protrusion protruding in the axial direction of the rotor (10) toward the casing (50), and a second protrusion protruding in the axial direction of the rotor (10) toward the rotor (10). If the labyrinth seal structure (100) is configured by the engagement between the protrusions protruding in the rotor axial direction, such a configuration makes it easier to maintain sealing performance even when the outer circumferential portion of the rotor (10) fluctuates in the axial direction due to displacement of the shaft, for example.

Figure 3:
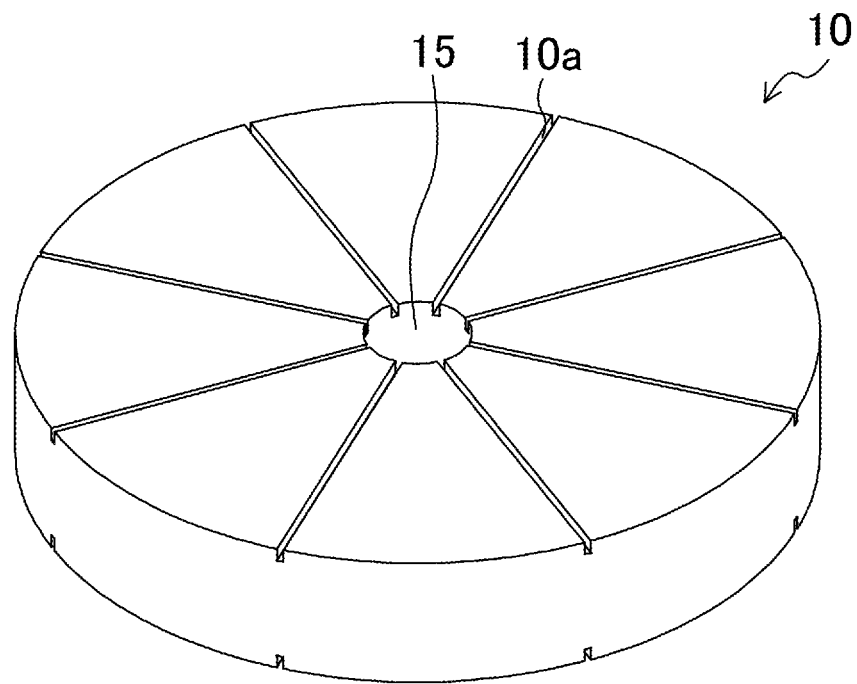
FIG. 3 is a perspective view of a rotor constituting the air conditioning rotating body according to the embodiment.
Figure 4:
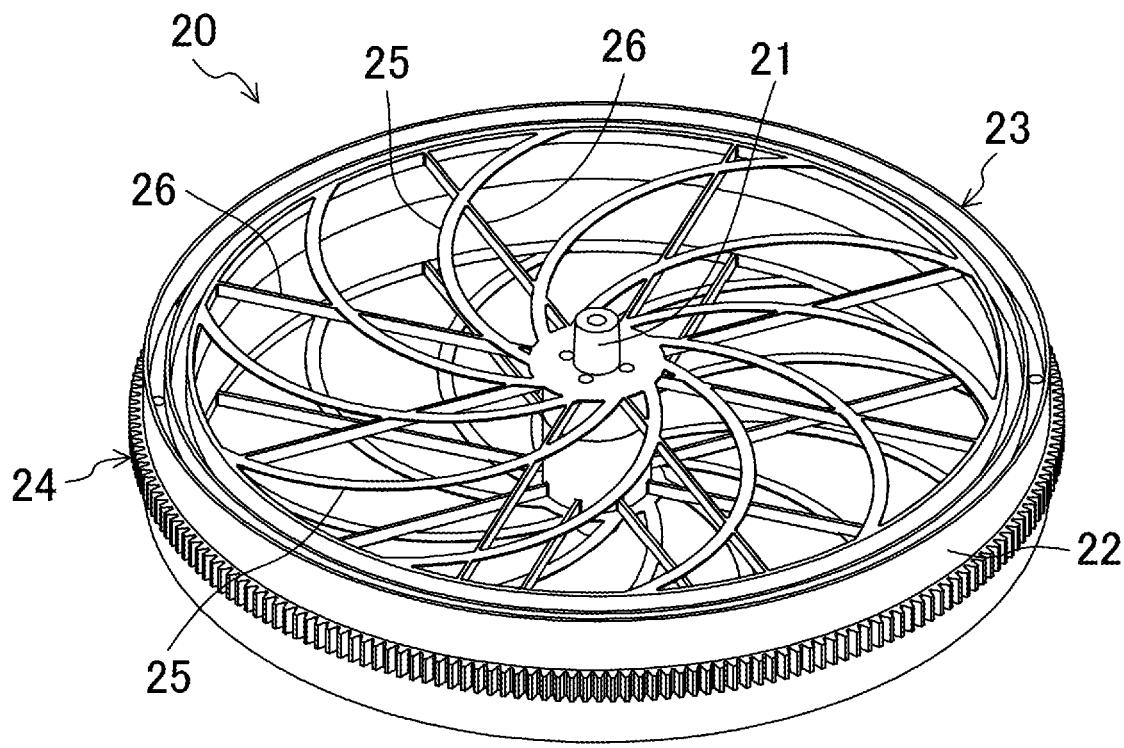
FIG. 4 is a perspective view of a protective case for accommodating the rotor illustrated in FIG. 3.
Figure 5:
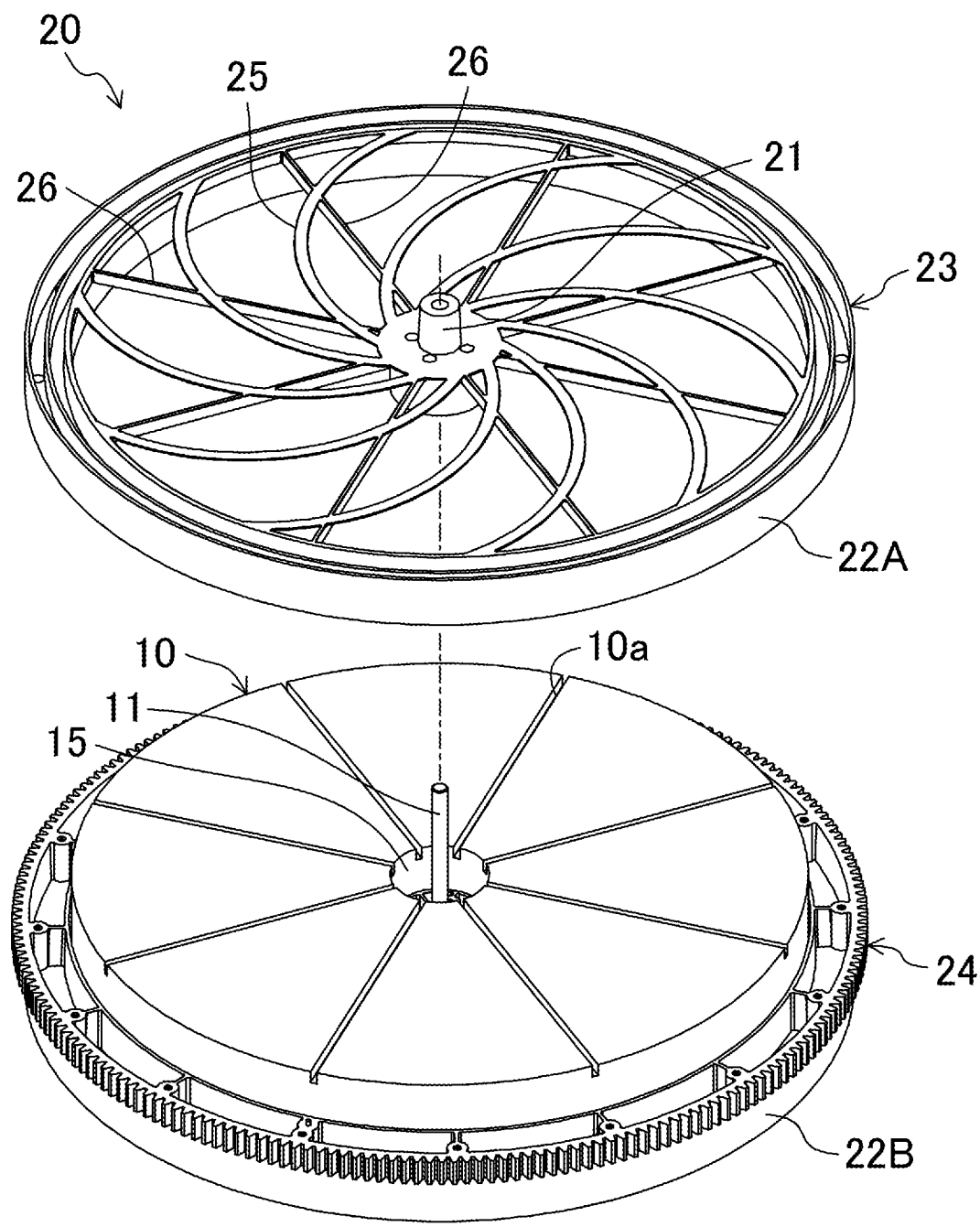
FIG. 5 is a perspective view illustrating how the rotor illustrated in FIG. 3 is accommodated in the protective case illustrated in FIG. 4.
Figure 6:
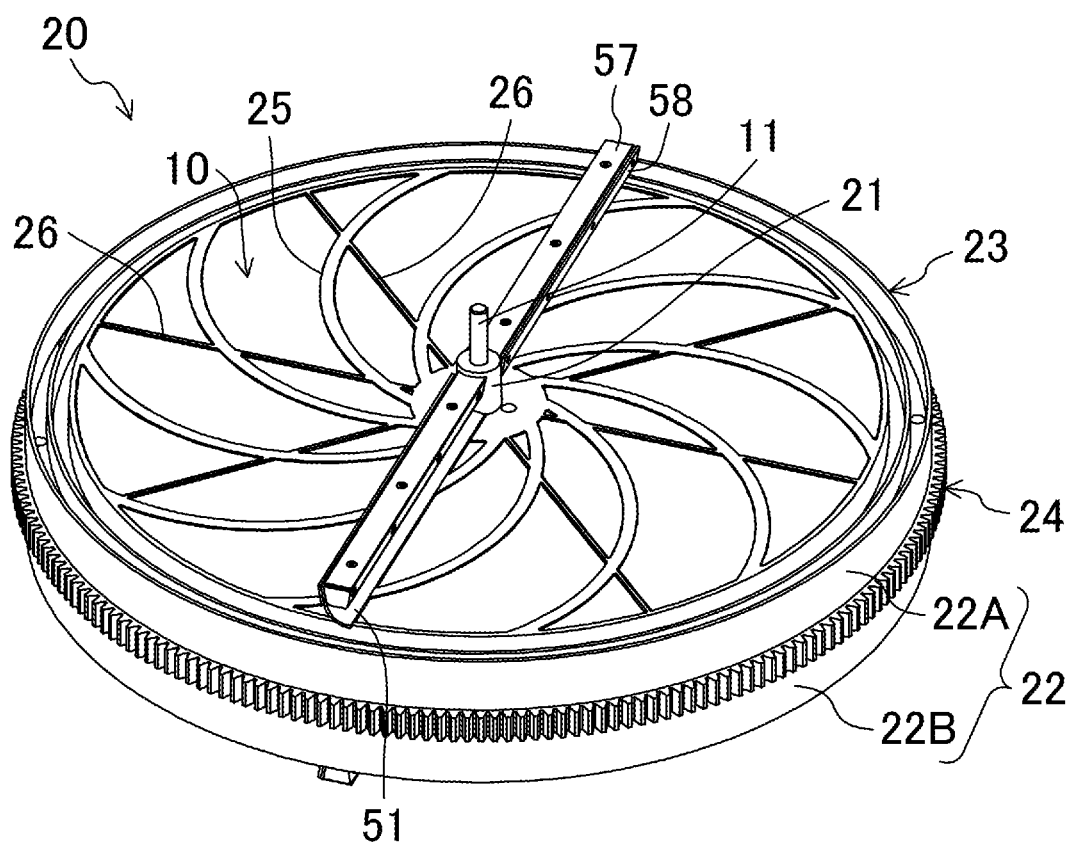
FIG. 6 is a perspective view illustrating the state in which the rotor illustrated in FIG. 3 is accommodated in the protective case illustrated in FIG. 4.

In this embodiment, the rotor (10) is a honeycomb-shaped adsorption element on which zeolite, for example, or another substance is supported, and is configured as a cylindrical body with a through hole (15) in the center, as illustrated in FIG. 3. The protective case (20) that protects the rotor (10) has an inner cylinder (21) fitted in the through hole (15) of the rotor (10) and supporting the shaft (11), and the annular side plate (22) that covers the side surface on the outer circumference of the rotor (10), as illustrated in FIGS. 4 to 6. The protective case (20) may be, for example, a resin molded product or may be made of sheet metal. The side plate (22) is separable into an upper side plate (22A) and a lower side plate (22B) for easy attachment and detachment of the protective case (20) to and from the rotor (10). The annular rotor-side seal (23) is provided on each of the upper and lower portions of the side plate (22). An annular gear (24) for rotating the air conditioning rotating body (30) by means of a motor and a small gear (both located outside the illustrated figures) is provided at an intermediate portion of a side surface on the outer circumference of the side plate (22). The inner cylinder (21) and the side plate (22) are connected to each other with spokes (25) and reinforcing ribs (26) which are in contact with respective axial end faces of the rotor (10). On each of the axial end faces of the rotor (10), open regions where the spokes (25) and the reinforcing ribs (26) are not provided serve as ventilation holes of the air conditioning rotating body (30). The spokes (25) may be curved in the circumferential direction of the rotor (10). The reinforcing ribs (26) may extend in the radial direction and may be fitted into the axial end faces of the rotor (10). The rotor (10) illustrated in FIG. 3 has grooves (10a) on the axial end faces. The grooves (10a) are for having part of the respective reinforcing ribs (26) fitted therein and extend along the radial direction.

As illustrated in FIG. 6, the sheet-like seal members (51), which separates the air passages (3) and (4) from each other, are slidably in contact with the axial end faces of the air conditioning rotating body (30). Each of the seal members (51) is an elastic element, such as rubber, and is arranged along the radial direction of the rotor (10). Instead of the seal members (51) made of elastic elements, edge surfaces (sliding surfaces) of the seal members (51) may be coated with a resin material or a metal material having excellent sliding properties to improve the durability of the seal members (51). Alternatively, edge portions of the seal members (51) may be made of a resin material or a metal material having excellent sliding properties.

The upper plate (50a) and the lower plate (50b) are each provided with supports (57) made of resin, for example, for separating the intake port (52), (54) and the exhaust port (53), (55) from each other. The seal member (51) is held by being partially sandwiched between a side surface of the support (57) and a plate body (58). The supports (57) extend from the inner cylinder (21) of the protective case (20) in two directions opposite to each other by 180° along the radial direction. Sheet surfaces of the seal members (51) may be inclined with respect to the axial direction of the rotor (10) to allow for a margin in the contact area between the seal members (51) and each axial end face of the air conditioning rotating body (30). This configuration allows the sealing structure to be maintained more easily even in the event of axial displacement of an element, such as the rotor (10), compared to the case where the sheet surfaces of the seal members (51) are arranged perpendicularly along the axial direction of the rotor (10).

In this embodiment, the air conditioning rotating body (30), i.e., rotor (10), is rotated with the spokes (25) arranged on each axial end face of the rotor (10); therefore, direct contact of the rotor (10) with the seal members (51) can be avoided due to the interposition of the spokes (25). Wear of the rotor (10) can thus be reduced. Wear of the seal members (51) can also be reduced by using a material having higher sliding properties than the material of the surface of the rotor (10) as the material of the spokes (25), that is, the protective case (20).

Figure 7:
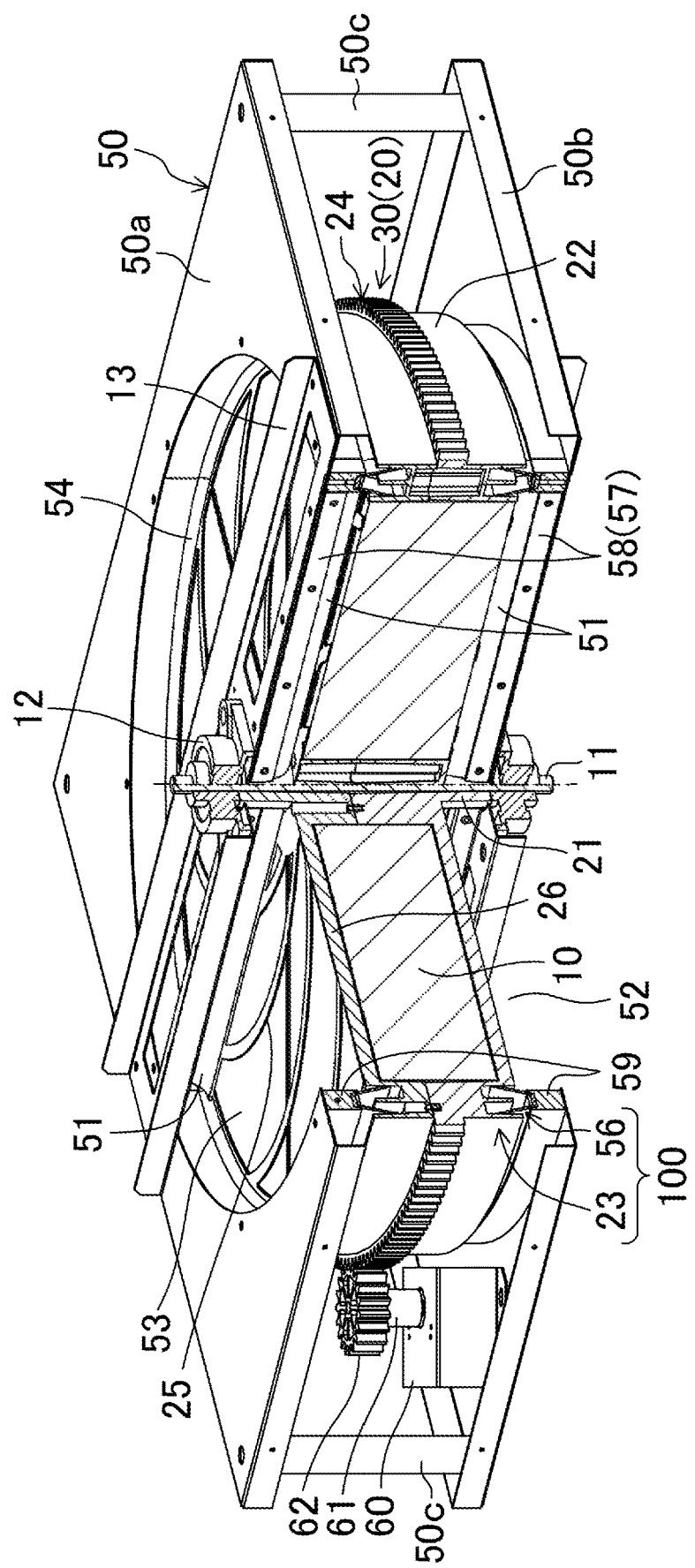
FIG. 7 is a perspective view illustrating the state in which the air conditioning rotating body according to the embodiment is accommodated in a casing, with part of the figure cut out.

The air conditioning rotating body (30) is housed in the casing (50) so as to be freely rotatable as illustrated in FIG. 7. A motor (60) and a small gear (62) connected to a shaft (61) of the motor (60) are provided on the lower plate (50b) of the casing (50) near the air conditioning rotating body (30). The small gear (62), when rotated by the motor (60), drives and rotates the annular gear (24) on the side plate (22) covering the side surface on the outer circumference of the rotor (10), causing the air conditioning rotating body (30) to rotate. The shaft (11) of the air conditioning rotating body (30), i.e., the rotor (10), is fixed to, and supported by, the inner cylinder (21) of the protective case (20), and portions of the shaft (11) protruding from upper and lower ends of the inner cylinder (21) are rotatably held by bearing portions (12). On a surface of each of the upper plate (50a) and the lower plate (50b) opposite to the surface facing the air conditioning rotating body (30), a bearing support (13) is provided along the boundary between the intake port (52), (54) and the exhaust port (53), (55). The bearing portions (12) are attached to the respective bearing supports (13). The supports (57) holding the seal members (51) are attached to a surface of the bearing support (13) facing the air conditioning rotating body (30).

An annular support (59) made of resin, for example, is provided at each of the peripheral portion of the exhaust port (53) and the intake port (54) of the upper plate (50a) and the peripheral portion of the intake port (52) and the exhaust port (55) of the lower plate (50b). The casing-side seal (56) is attached to a surface of the annular support (59) facing the air conditioning rotating body (30). The end face of the support (57) on the outer circumference side of the rotor (10) is connected to an inner circumferential surface of annular support (59).

Contact Between Seal Member and Air Conditioning Rotating Body

Figure 8:
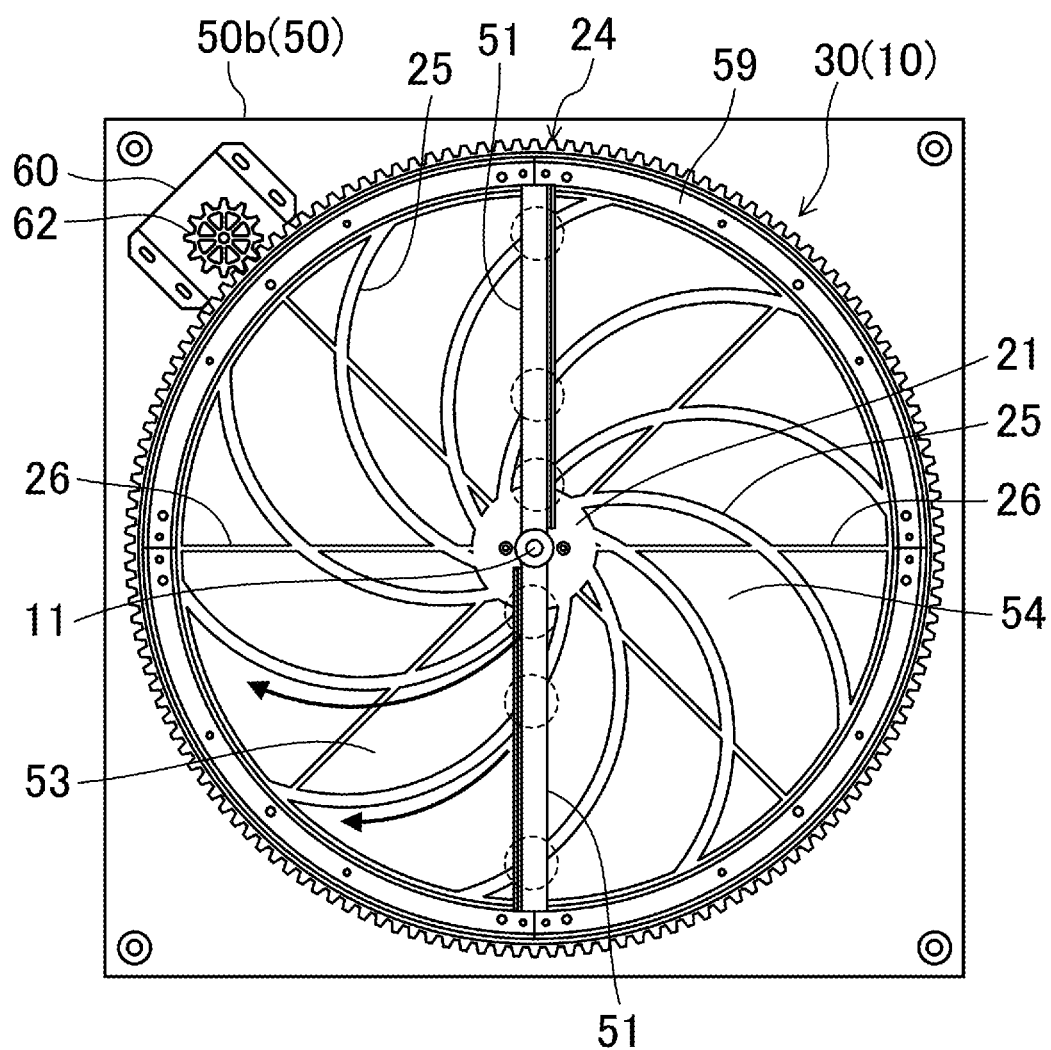
FIG. 8 is a plan view of the air conditioning rotating body according to the embodiment, as viewed from an axial direction of the rotor.

FIG. 8 is a plan view of the air conditioning rotating body (30) viewed from above in the axial direction of the rotor (10) with the upper plate (50a) of the casing (50) removed. In FIG. 8, a structure (such as the supports (57)) for holding the seal members (51) is omitted.

In this embodiment, as illustrated in FIG. 8, the spokes (25) of a thickness of, for example, about 1 mm to 2 mm is provided as an elevation on each axial end face of the rotor (10) to make the seal members (51) in contact with the spokes (25), thereby preventing the seal members (51) from making direct contact with the rotor (10). Wear of the rotor (10) can thus be reduced. Wear of the seal members (51), which come into contact with the spokes (25) when the air conditioning rotating body (30) rotates, can be further reduced by using, as the material for the spokes (25), a material having superior sliding properties to the material for the rotor (10).

If the gap between each axial end face of the rotor (10) and the seal members (51) is too large, air leakage through the gap occurs. Therefore, the thickness of each spoke (25) is preferably about 3 mm or less, more preferably about 1.5 mm or less.

One of the characteristics of this embodiment is that the shape of the spokes (25) (shape viewed from the axial direction of the rotor (10)) is set so that the contact points (indicated by the dashed circles in FIG. 8) of the seal member (51) extending in the radial direction of the rotor (10) with the spokes (25) move in the radial direction as the rotor (10) rotates. For example, if the spokes (25) are each formed into an arc shape curving in the circumferential direction of the rotor (10), as illustrated in FIG. 8, the contact points of the spokes (25) with the seal member (51) move on the arc-shaped spokes (25) from the radially inside to the radially outside of the rotor (10) as the rotor (10) rotates. In FIG. 8, the solid arrows show the trajectories of the moving contact points between the spokes (25) and the seal member (51) when the air conditioning rotating body (30) rotates counterclockwise as viewed from above in the axial direction of the rotor (10). Looking at the seal member (51), the contact points with the spokes (25) move in the radial direction as the rotor (10) rotates.

The shape of the spokes (25) is not limited as long as the spokes (25) each have a portion that extends diagonally with respect to the radial direction of the rotor (10). The spokes (25) may be arc-shaped, or S-shaped or zigzag-shaped, for example.

As illustrated in FIG. 8, the seal member (51) may be in contact with a plurality of spokes (25) at any rotational position of the air conditioning rotating body (30). In FIG. 8, the seal member (51) corresponding to the radius of the rotor (10) is in contact with the three spokes (25).

Further, as illustrated in FIG. 8, both of the axial end faces of the rotor (10) may be provided with the reinforcing ribs (26) extending in the radial direction. At least part of each reinforcing rib (26) may be fitted into the axial end faces of the rotor (10) by, for example, about 1 cm. The reinforcing rib (26) may be connected to one spoke (25) or a plurality of spokes (25). The reinforcing rib (26) and the spoke (25) may have end faces, in the axial direction of the rotor (10), which are flush with each other, or the end face of the reinforcing rib (26) may be lower than the end face of the spoke (25). In the latter case, the contact between the reinforcing rib (26) and the seal member (51) is reduced, thereby making it possible to reduce wear of the seal member (51).

Advantages of Embodiment

According to the air conditioning rotating body (30) of this embodiment, the contact points between the spokes (25) on the axial end faces of the rotor (10) and the seal member (51) that separates the air passages move in the radial direction as the rotor (10) rotates. It is therefore possible to reduce air leakage due to local progress of wear caused by concentration of loads on a specific portion of the seal member (51). Further, the frequency of replacement of the seal member (51) due to wear of the seal member (51) can be reduced, thereby preventing an increase in cost and a decrease in operating rate.

In the air conditioning rotating body (30) of this embodiment, the seal member (51) may be in contact with a plurality of spokes (25). This means that the seal member (51) is supported by the spokes (25) at multiple points. The load on the seal member (51) is equal to a force that makes the seal member (51) deformed by the contact with the spokes (25) return to its original shape. Thus, supporting the seal member (51) by the spokes (25) at multiple points spreads the load per contact point on the seal member (51). Since the amount of wear of the seal member (51) is proportional to the load on the seal member (51), the structure of supporting the seal member (51) by the spokes (25) at multiple points can further reduce local wear of the seal member (51). On the other hand, according to the configuration of Patent Document 1, edges of the seal members are brought into contact with the case of the rotor all the time, and loads are concentrated on the edges; therefore, wear of the edges of the seal members progresses.

In the air conditioning rotating body (30) of this embodiment, the spoke (25) may have a curved shape that curves in the circumferential direction of the rotor (10). In this configuration, in which the seal member (51) is supported by the curved spoke (25), the support point for the seal member (51) is movable in the radial direction of the rotor (10) as the rotor (10) rotates. Wear of the seal member (51) can thus be reduced.

In the air conditioning rotating body (30) of this embodiment, the axial end faces of the rotor (10) may be provided with the reinforcing rib (26) extending in the radial direction (i.e., the linear reinforcing rib (26)). This configuration can reinforce the support structure for the rotor (10) and reduce warpage of the rotor (10). An increase in gap between the rotor (10) and the seal member (51) can thus be reduced, making it possible to reduce air leakage.

Further, the air treatment device (1) of this embodiment includes the air conditioning rotating body (30) that can reduce air leakage caused by wear of the seal member (51) separating the air passages (3) and (4). This can improve the performance of the air treatment device (1), such as dehumidification and humidification performance and heat exchange performance.

First Variation

A first variation of the present disclosure will be described below with reference to the drawings.

Figure 9:
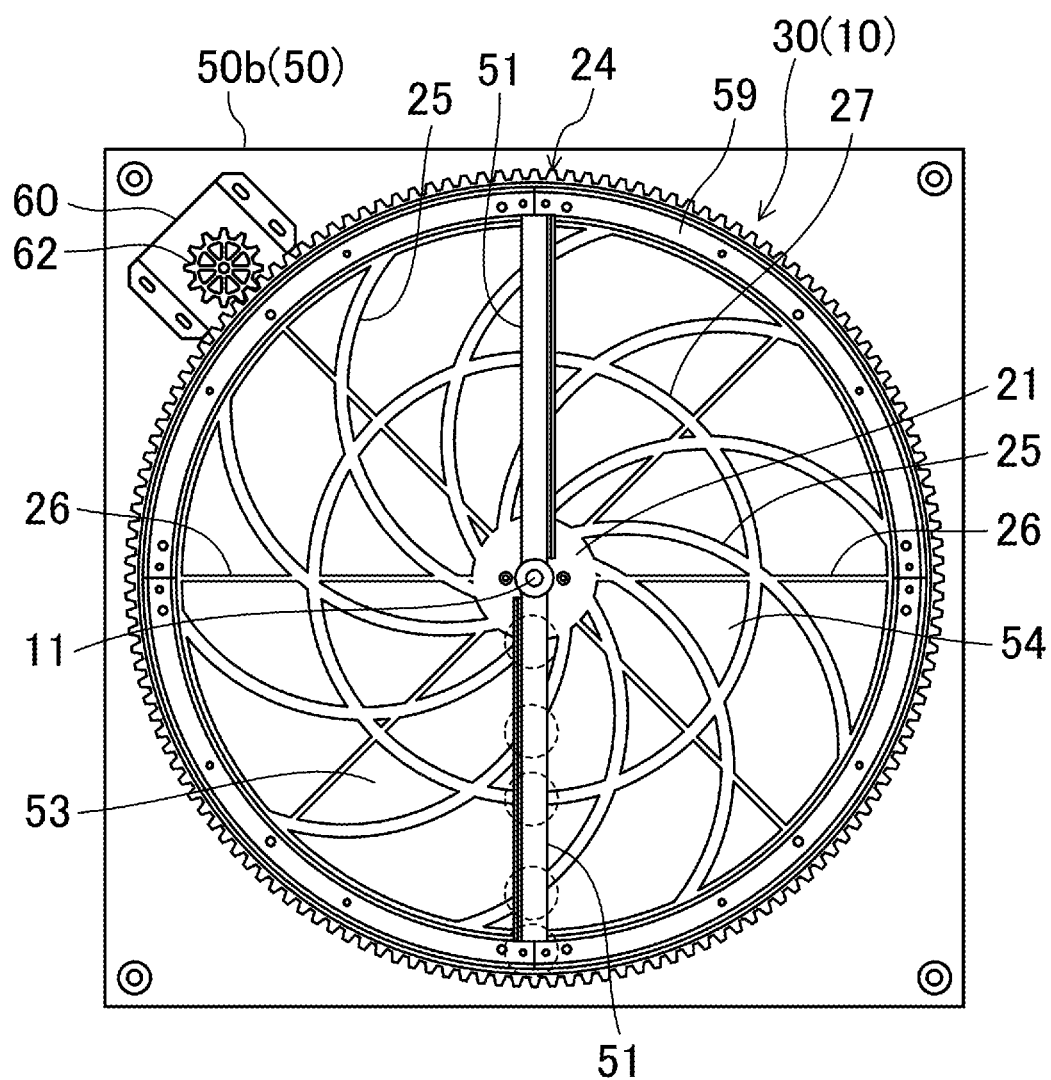
FIG. 9 is a plan view of an air conditioning rotating body according to a first variation, as viewed from an axial direction of a rotor.

The first variation differs from the above embodiment in that, as illustrated in FIG. 9, the axial end face of the rotor (10) is provided with an annular member (27) surrounding the center of the rotor (10) circumferentially, specifically a true-circular member concentric with the rotor (10). In FIG. 9, the same reference characters are used to designate the same elements as those in the embodiment illustrated in FIG. 8.

According to this first variation, the following effects can be obtained in addition to the effects similar to those of the above-described embodiment. That is, the arrangement of the annular member (27) increases the number of support points for the seal member (51), spreading the load per support point on the seal member (51). Local wear of the seal member (51) can thus be further reduced. Connecting the annular member (27) with the spokes (25) can reinforce the spokes (25).

Second Variation

A second variation of the present disclosure will be described below with reference to the drawings.

Figure 10:
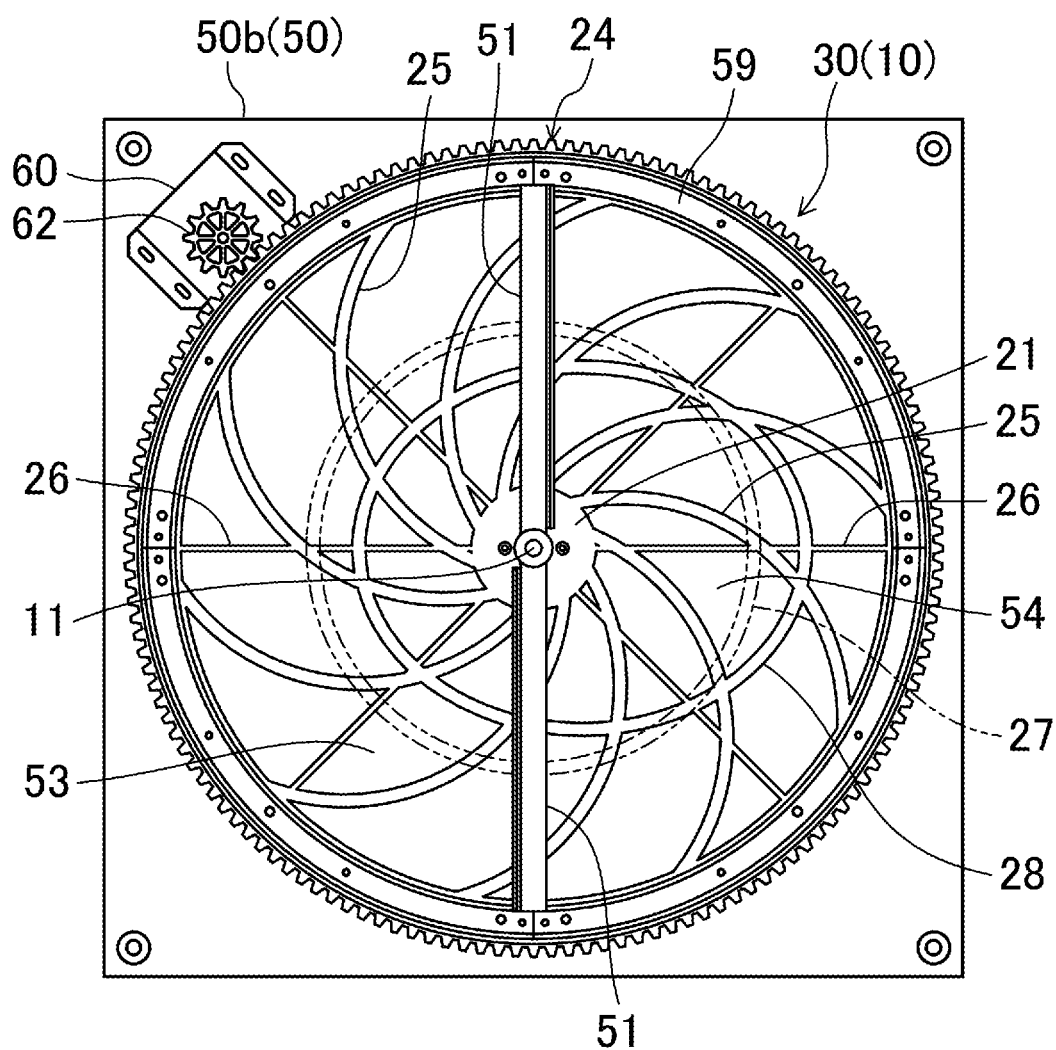
FIG. 10 is a plan view of an air conditioning rotating body according to a second variation, as viewed from an axial direction of a rotor.

A true-circular member concentric with the rotor (10) is provided as the annular member (27) in the above first variation, as illustrated in FIG. 9. On the other hand, an oval member with a focal point at the center of the rotor (10) is provided as an annular member (28) in the second variation, as illustrated in FIG. 10. In FIG. 10, the same reference characters are used to designate the same elements as those in the first variation illustrated in FIG. 9. In FIG. 10, the annular member (27) illustrated in FIG. 9 is indicated by broken curves.

According to this second variation, the following effects can be obtained in addition to the effects similar to those of the above-described first variation. That is, according to the configuration of the second variation, local wear of the seal member (51) can be reduced more than in the configuration of the first variation, because the contact points of the seal member (51) with the annular member (28) move in the radial direction of the rotor (10) as the rotor (10) rotates. In this case, it is more preferable to make the width of the annular member (28) in the radial direction of the rotor (10) smaller than the distance of movement of the contact point of the seal member (51) with the annular member (28).

The similar effects to those in the second variation are obtainable even if the oval member with a focal point at the center of the rotor (10) is replaced, as the annular member (28), with a true-circular member eccentric to the rotor (10).

Third Variation

A third variation of the present disclosure will be described below with reference to the drawings.

Figure 11A:
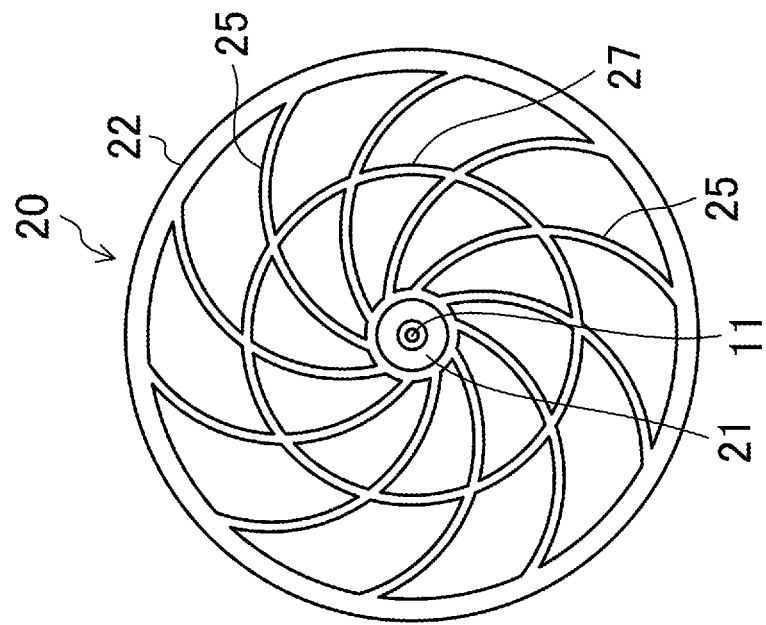
FIGS. 11A-11C are diagrams illustrating a state in which an air conditioning rotating body according to a third variation has spokes in mirror symmetry on both end faces in the axial direction of the rotor.
Figure 11B:
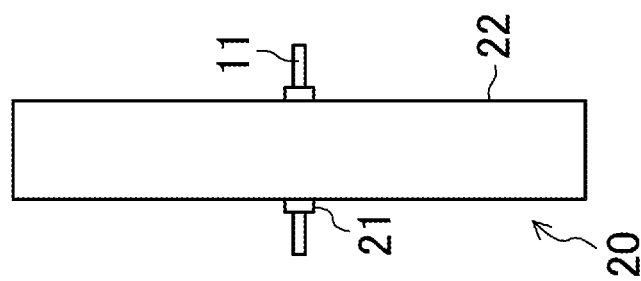
Figure 11C:
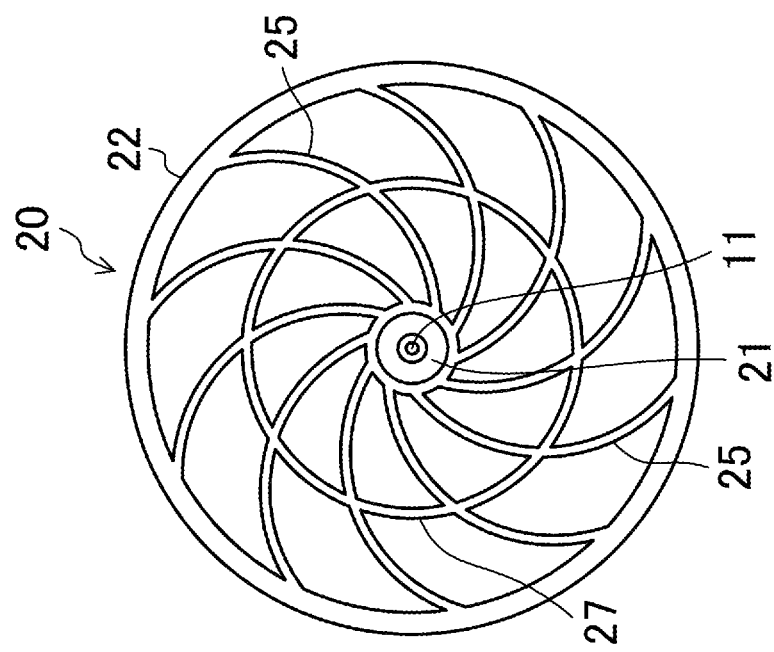

In this third variation, as illustrated in FIGS. 11A-11C, the spokes (25) are provided on each of both axial end faces of the rotor (10), and the spokes (25) provided on both of the end faces are arranged to overlap each other when viewed from the axial direction of the rotor (10). In FIGS. 11A-11C, FIG. 11A illustrates a planar configuration of the protective case (20) including the shaft (11), as viewed from one side in the axial direction of the rotor (10); FIG. 11B illustrates a side configuration of the protective case (20) including the shaft (11), as viewed from the radial direction of the rotor (10); and FIG. 11C illustrates a planar configuration of the protective case (20) including the shaft (11), as viewed from the other side in the axial direction of the rotor (10). In FIGS. 11A-11C, the same reference characters are used to designate the same elements as those in the embodiment illustrated in FIG. 8.

As illustrated in FIGS. 11A-11C, in this third variation, the protective case (20) is not provided with the reinforcing ribs (26), but provided with an annular member (27) similar to that in the first variation. The annular members (27) provided on both of the axial end faces of the rotor (10) are arranged to overlap each other when viewed from the axial direction of the rotor (10).

In the configuration of the third variation, the spokes (25) and other parts are arranged in mirror symmetry on both axial end faces of the rotor (10). Thus, the air that has flowed into the rotor (10) through open regions on one side in the axial direction of the rotor (10) flows out through open regions on the other side in the axial direction of the rotor (10) without colliding with non-opening regions on the other side. The substantial opening area is therefore increased on both sides in the axial direction of the rotor (10), making it possible to improve the air conditioning capacity.

In the third variation, the reinforcing ribs (26) may be arranged on both of the axial end faces of the rotor (10) so as to overlap each other when viewed from the axial direction of the rotor (10). Further, the protective case (20) does not have to include the annular members (27). Alternatively, the annular members (28) similar to that of the second variation may be arranged on both of the axial end faces of the rotor (10), instead of the annular members (27), so as to overlap each other when viewed from the axial direction of the rotor (10).

OTHER EMBODIMENTS

In the foregoing embodiment (including the variations, hereinafter the same), the air treatment device (1) is configured as a dehumidifying/humidifying device, by using, as the rotor (10) of the air conditioning rotating body (30), a honeycomb-shaped adsorption element on which zeolite is supported. However, instead of this configuration, for example, the air treatment device (1) may be configured as a deodorizer, a gas separator, or the like, by using an air conditioning rotating body with a rotor that is a honeycomb-shaped adsorption element on which another adsorbent, such as porous silica or activated alumina, is supported. Alternatively, for example, the air treatment device (1) may be configured as a heat exchanger, by using an air conditioning rotating body with a rotor made of a material with excellent heat storage properties, such as aluminum or stainless steel.

In the above embodiment, the air conditioning rotating body (30) is arranged in the air treatment device (1) such that the radial direction of the rotor (10) is along the horizontal direction. However, instead of this configuration, the air conditioning rotating body (30) may be arranged in the air treatment device (1) such that the radial direction of the rotor (10) is along the perpendicular (vertical) direction.

In the above embodiment, the two air passages (3) and (4) are formed in the air treatment device (1), and the air conditioning rotating body (30) is arranged over both of the air passages (3) and (4). However, the number of air passages in the air treatment device (1) (i.e., the number of air passages where the air conditioning rotating body (30) is arranged) is not particularly limited, and may be three or more.

While the embodiments and variations have been described above, it will be understood that various changes in form and details can be made without departing from the spirit and scope of the claims. The above embodiments and variations may be appropriately combined or replaced as long as the functions of the target of the present disclosure are not impaired.

As can be seen from the foregoing description, the present disclosure is useful for an air conditioning rotating body and an air treatment device.

The invention claimed is:

1. An air conditioning rotating body comprising:
   a rotor having a cylindrical shape, the rotor being configured to be housed in a casing so as to be freely rotatable, the casing including a seal member, and the air conditioning rotating body being configured to treat air passing through the rotor in an axial direction,
   the seal member including a portion that extends in a radial direction of the rotor and separating air passages,
   an end face of the rotor in the axial direction being provided with at least one spoke in contact with the seal member,
   the at least one spoke being provided only on the end face of the rotor in the axial direction,
   a contact point of the portion of the seal member with a single spoke of the at least one spoke being configured to move in the radial direction as the rotor rotates.

2. The air conditioning rotating body of claim 1, wherein the at least one spoke includes a plurality of spokes, and the seal member contacts at least two of the plurality of the spokes.

3. The air conditioning rotating body of claim 1, wherein the at least one spoke is curved in a circumferential direction of the rotor.

4. The air conditioning rotating body of claim 2, wherein each of the plurality of spokes is curved in a circumferential direction of the rotor.

5. The air conditioning rotating body of claim 1, wherein the end face of the rotor is further provided with a reinforcing rib extending in the radial direction.

6. The air conditioning rotating body of claim 2, wherein the end face of the rotor is further provided with a reinforcing rib extending in the radial direction.

7. The air conditioning rotating body of claim 3, wherein the end face of the rotor is further provided with a reinforcing rib extending in the radial direction.

8. The air conditioning rotating body of claim 1, wherein the end face of the rotor is further provided with an annular member surrounding a center of the rotor circumferentially.

9. The air conditioning rotating body of claim 2, wherein the end face of the rotor is further provided with an annular member surrounding a center of the rotor circumferentially.

10. The air conditioning rotating body of claim 3, wherein the end face of the rotor is further provided with an annular member surrounding a center of the rotor circumferentially.

11. The air conditioning rotating body of claim 5, wherein the end face of the rotor is further provided with an annular member surrounding a center of the rotor circumferentially.

12. The air conditioning rotating body of claim 1, wherein the at least one spoke includes a spoke provided on each of both end faces of the rotor in the axial direction, and the spokes provided on both the end faces overlap each other when viewed from the axial direction.

13. The air conditioning rotating body of claim 2, wherein the plurality of spokes includes spokes provided on each of both end faces of the rotor in the axial direction, and the spokes provided on both the end faces overlap each other when viewed from the axial direction.

14. The air conditioning rotating body of claim 3, wherein the at least one spoke includes a spoke provided on each of both end faces of the rotor in the axial direction, and the spokes provided on both the end faces overlap each other when viewed from the axial direction.

15. The air conditioning rotating body of claim 5, wherein the at least one spoke includes a spoke provided on each of both end faces of the rotor in the axial direction, and the spokes provided on both the end faces overlap each other when viewed from the axial direction.

16. The air conditioning rotating body of claim 8, wherein the at least one spoke includes a spoke provided on each of both end faces of the rotor in the axial direction, and the spokes provided on both the end faces overlap each other when viewed from the axial direction.

17. An air treatment device including the air conditioning rotating body of claim 1.

18. An air treatment device including the air conditioning rotating body of claim 2.

19. An air treatment device including the air conditioning rotating body of claim 3.

20. An air treatment device including the air conditioning rotating body of claim 5.

* * * * *